March 7, 1933. R. STAR 1,900,774
TANK GAUGE
Filed May 23, 1929 2 Sheets-Sheet 1
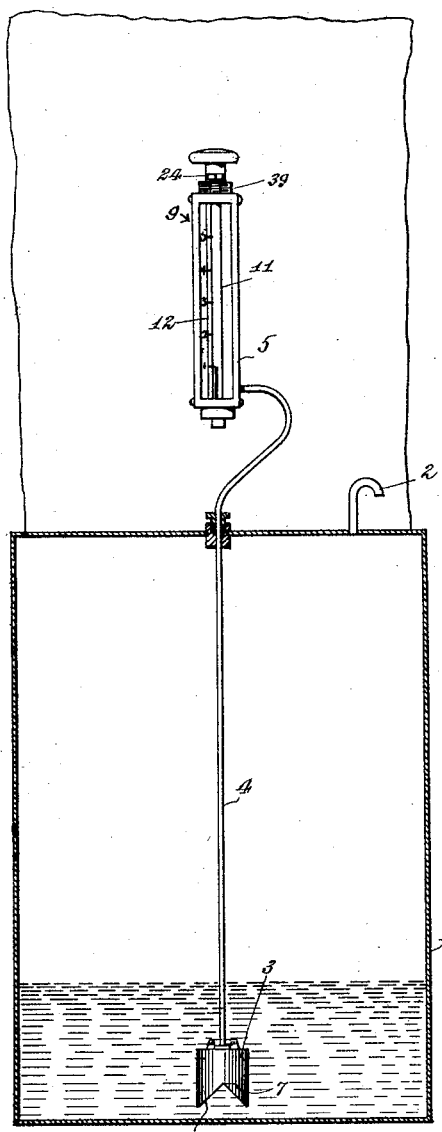
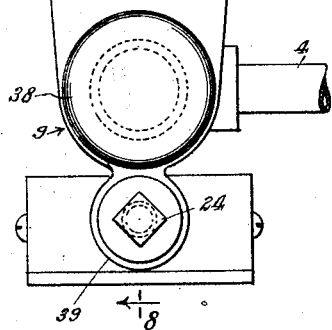
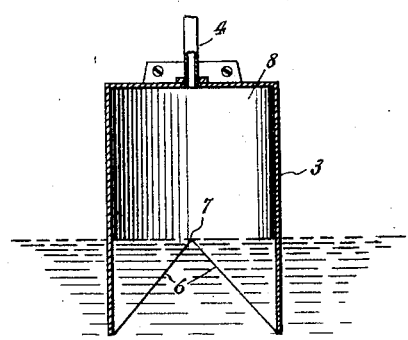
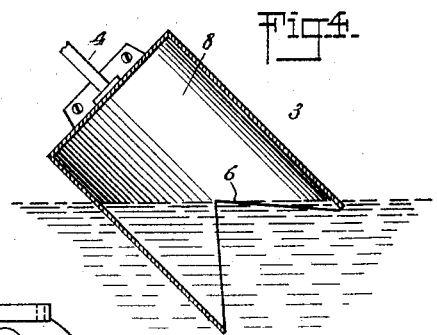
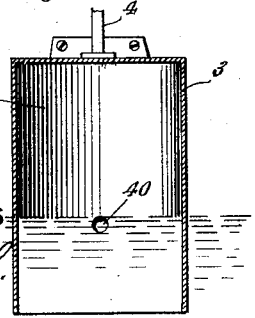
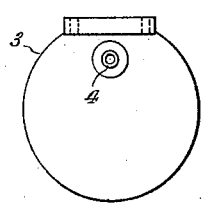
WITNESSES
INVENTOR
Richard Star
BY
ATTORNEYS March 7, 1933.                R. STAR                1,900,774
TANK GAUGE
Filed May 23, 1929            2 Sheets-Sheet 2
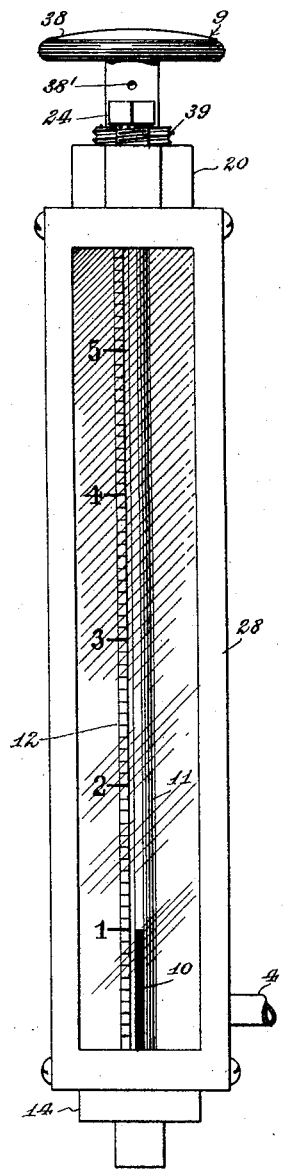
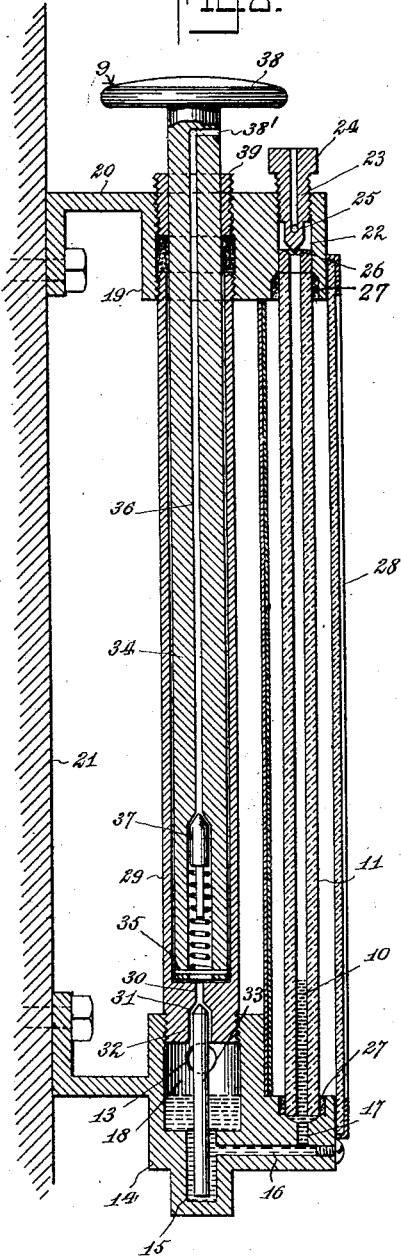
WITNESSES
William P. Goebel
A. L. Kitchin
INVENTOR
Richard Star
BY
ATTORNEYS Patented Mar. 7, 1933

1,900,774

UNITED STATES PATENT OFFICE

RICHARD STAR, OF BROOKLYN, NEW YORK

TANK GAUGE

Application filed May 23, 1929. Serial No. 365,463.

This invention relates to tank gauges and particularly to an improved gauge for oil tanks on ships, although the gauge might be used on liquid carrying tanks at other places, the object being to provide a structure wherein an accurate reading may be secured, indicating the depth of liquid in the tank.

Another object of the invention is to provide a gauge for tanks which will give an accurate reading when used on a ship notwithstanding the rolling of the ship.

A still further object of the invention is to provide a tank gauge wherein an indicating member is arranged at a convenient point and an air chamber is arranged near the bottom of a tank, with proper connections, the air chamber being formed with a notch or opening determining the level of liquid therein, with the notch arranged fore and aft of the vessel, so that the rolling of the vessel will not affect the accuracy of the instrument.

In the accompanying drawings,

Fig. 1 is a sectional view through an oil carrying tank and part of a ship supporting the indicating member, with suitable connections showing in a somewhat schematic manner the location and operation of the gauge.

Fig. 2 is a top plan view of the pump and indicator shown in Fig. 1, the same being on an enlarged scale;

Fig. 3 is an enlarged vertical sectional view through the air chamber shown in Fig. 1;

Fig. 4 is a view similar to Fig. 3, but illustrating the action of the parts when the ship has rolled over to an appreciable extent;

Fig. 5 is a top plan view of the air chamber shown in Fig. 3;

Fig. 6 is a view similar to Fig. 3 but showing a modified form of the invention;

Fig. 7 is a front view on an enlarged scale, of the indicator and pump shown in Fig. 1;

Fig. 8 is a sectional view through Fig. 2 on line 8—8.

Referring to the accompanying drawings by numerals, 1 indicates an oil carrying tank for ships which use oil as a fuel. This tank is provided with the usual vent 2 and may be of any desired size. Arranged in this tank is an air chamber 3 connected by a pipe 4 to the indicator 5 which, when operated properly, will give a true reading indicating the level of liquid in the tank 1. The gauge is particularly adapted for gauging the level of oil in tanks of ships, but it could be used in other places without departing from the spirit of the invention.

Heretofore, different forms of gauges have been provided, wherein a pump was used to provide the desired pressure in the indicator for causing the same to indicate the proper level of oil in the tank. Most of these gauges would more or less accurately indicate the level of oil in the tank when the tank was in a perfectly horizontal position, but when the ship rolled there would be an appreciable error. In the present instance, the structure has been designed especially to prevent this error and to accurately give the level of oil in the tank when the tank is horizontal after it has leaned to an appreciable extent, as for instance, 45 degrees. In order to secure this result the chamber 3 is provided with a notch 6 having the apex 7 arranged preferably centrally and positioned fore and aft of the ship, so that when the ship rolls, the air chamber 3 will assume the position shown in Fig. 4 or some other intermediate position. By providing this structure the oil will always be up to the point or apex 7, and when the ship rolls the volume in the upper space 8 will always remain the same. When the air pressure is low the oil may rise into the space 8, but when the pump 9 is operated and sufficient air provided the oil will be lowered in chamber 3 until air begins to pass out at the apex 7. When this takes place the oil will not be lowered to any greater extent and consequently there will be an equilibrium between the air pressure and the oil pressure. When this takes place the air in the pipe 4 and chamber 8 and associated parts is allowed to act on the mercury 10 in the glass gauge 11 to cause the same to rise. A scale 12 is provided which will indicate inches, feet or any other designation to make clear to the observer the level of the oil in tank 1. This may be calibrated to indicate tons or fractions, or feet or fractions thereof. In order to secure this result the pipe 4 is connected at point 13 to the base or casting 14. This base or casting is provided with a wall 15 having a passageway 16 merging into an auxiliary passageway 17. This auxiliary passageway is in free communication with the bore of the glass tube 11. The opening 13 merges into a chamber 18 which is partly filled with mercury and by reason of the passageway just set forth, air entering the chamber 18 will force the mercury column 10 upwardly in proportion to the pressure of the air, which is regulated by the level or pressure of oil in the tank 1. The upper end or casting 19 is associated with the base or casting 14 and, similar to this casting, is provided with a bracket 20 whereby the parts may be bolted to a part of the ship 21. The casting 19 is provided with a threaded passageway 22 for receiving the valve 23, which valve has a longitudinally arranged passageway 24 merging into a transverse passageway 25. The passageway 25 opens into the bore 22, so that whenever the valve 23 is moved off of its seat 26 air may pass into and out of the bore of the tube 11. A suitable packing, as for instance cement, may be used for producing an air-tight connection betwen the upper end of the pipe 11 and the casting 19 at bore 22. A similar packing 27 may be used at the bottom of the tube 11, to make an air and mercury-tight connection. A suitable metal frame 28 is secured in any desired manner to the members 14 and 19 so as to protect the tube 11.

A pump tube or chamber 29 is threaded into the chamber 18 and at the lower end is provided with a restricted passageway 30 merging into a seat 31, which seat merges into a larger portion 32. The portion 32 and seat 31 accommodate the valve 33. The lower end of the valve 33 extends into the wall 15 whereby this valve is floated upwardly by the mercury to normally close the passageway 30. The pump plunger 34 is provided with a longitudinally positioned bore 36 which is normally closed by a spring-pressed valve 37, held up by pin 35, but which is opened when the knob or handle 38 is pulled upwardly to draw in a supply of air. From Fig. 8 it will be noted that the bore 36 is provided with a laterally-extending bore 38' whereby, when the plunger is moved upwardly, air will be drawn into the lower part of the cylinder 34, the valve 37 opening for this purpose and the valve 33 automatically closing. On the return or power stroke the valve 37 will close and the valve 33 will open, whereby air is forced into the chamber 18, and from thence through opening 13 into pipe 4, and finally into the air chamber 3. Before this pumping operation takes place valve 23 is closed. This is done in order to prevent the mercury 10 from being forced out of the tube 11. As shown in Fig. 8, the upper end of the pump cylinder 29 is screwed into the casting 19 and a suitable packing gland 39 is provided for the plunger 34. The connections of the pipe 4 and associated parts are made as air-tight as possible, but notwithstanding this, there will be a gradual loss of pressure, so that in order to take a reading at any time the valve 23 is closed and pump 9 operated until air begins to pass out of the air chamber 3, at point 7. When this takes place the pressure of the air will equal the pressure of the oil and consequently the operation of the pump may stop. As soon as the pump has stopped the valve 23 is opened and immediately the air pressure in chamber 18 will force the mercury from this chamber through the passageways 16 and 17 into the tube 11. The level of the mercury therein will properly indicate the level of the oil in tank 1. A reading may be taken at any time and it will be accurate even though the ship may be rolling to a great extent.

The construction shown in Fig. 3 has been found to be very efficient but under some circumstances instead of having the notch 6, an aperture 40 could be provided, which would take the place of this notch and also the point 7. When this form is used the same results are secured, as the air will escape at the aperture 40 when the pressure thereof is equal to the pressure of the oil. The air chamber 3 is preferably round and provided with two apertures 40, and these apertures are arranged fore and aft, similar to the apex or point 7.

What is claimed is:

1. A tank gauge including an air chamber adapted to be placed adjacent the bottom of the tank, said chamber having a closed top and a depending wall and being provided with a pipe-receiving opening at the top and with an open bottom, said wall of the air chamber having a pair of substantially triangular notches pointing toward the top so that the apices of the notches will be between the top and bottom of the chamber and parallel with the axis of the tilt of the tank, whereby pressure of air in the air chamber will prevent the level of oil from moving above said apex when the chamber is functioning.

2. A tank gauge for a liquid containing tank positioned in a ship including an air chamber adapted to be placed adjacent the bottom of the tank formed with a closed top and sides and an open bottom, an inlet pipe connected with said top, said sides being provided with diametrically opposed apertures at a point between the top and bottom, said apertures being positioned fore and aft of the ship on which the device is mounted, whereby the roll of the ship will not affect the quantity of air in the chamber when the chamber is functioning.

3. In a gauge for tanks for gauging the depth of liquid therein, a pressure responsive gauge, a pump for supplying air under pressure to said gauge, said gauge including a base formed with a base chamber in communication with said pump, a supply of mercury arranged in said base chamber, said base chamber having a laterally extending passageway near the bottom thereof, said passageway being normally filled with some of said mercury, an upright glass tube connected with said passageway and extending vertically upwardly therefrom, means surrounding the upper end of said glass tube and acting as a support for said pump, said means being provided with a chamber above said glass tube, a manually actuated valve carried by said means formed with a reduced end portion having a part adapted to engage said glass tube for closing the opening therein, and a passageway extending laterally through the reduced portion and axially in respect to the glass tube, whereby said passageway continually vents the chamber in said means, said valve acting to prevent the escape of mercury during the action of said pump, while the chamber and valve act to vent the air from said glass and catch any mercury discharged from the upper end of the tube.

4. In a tank gauge, means forming a chamber open at the bottom and closed at the top and provided with a depending wall formed with a pair of diametrically opposed triangular notches extending from the bottom towards the top so that the apex of the notches will be between the top and the bottom of the chamber, said chamber being adapted to be placed adjacent the bottom of a tank, a pipe extending through the top of said chamber and a combined gauge and pump connected with said pipe, said combined gauge and pump including a pump structure, a base adapted to receive one end of the pump structure, said base having a mercury chamber provided with a lateral extending bore, said pipe having one end discharging pipe into the top of the mercury chamber whereby when said pump is operated air will be forced into the mercury chamber above the mercury therein and into said pipe and said air chamber until the liquid in said air chamber moves down to the level of apexes of said notches, a supply of mercury filling said bore and part of said mercury chamber and a glass tube connected with said base and in free communication to said bore whereby the mercury will rise in said glass tube a distance proportionate to the pressure of air in the mercury chamber and in said air chamber.

5. A tank gauge comprising an air chamber adapted to be placed adjacent the bottom of the tank, said chamber having a closed top, a depending wall, and an open bottom, said wall having a pair of triangular shaped diametrically opposed notches extending from the bottom toward the top with a line drawn from the apex of one notch to the other being parallel to the tilt of said tank, a pipe leading from the top of said air chamber, an air operated indicator connected with said pipe, and a pump connected with said pipe for providing air in the pipe, the indicator, and the air chamber.

Signed at New York in the county of New York and State of New York this 17th day of May A. D. 1929.

RICHARD STAR.